April 7, 1931. W. W. SAYERS ET AL 1,799,150
SEWAGE DISPOSAL APPARATUS
Filed April 24, 1929 2 Sheets-Sheet 2
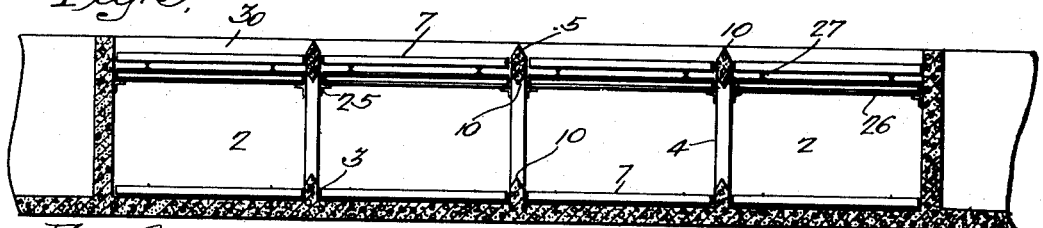
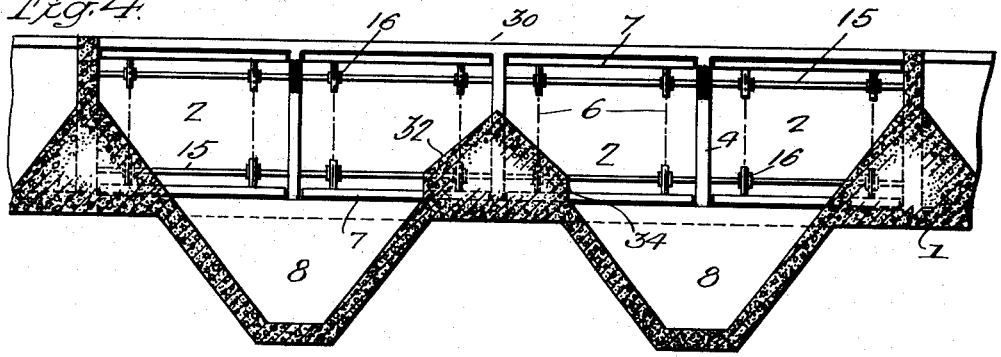
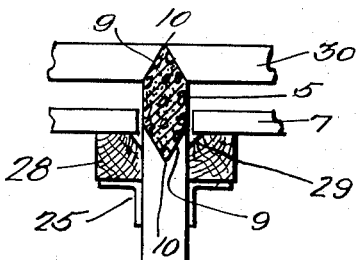
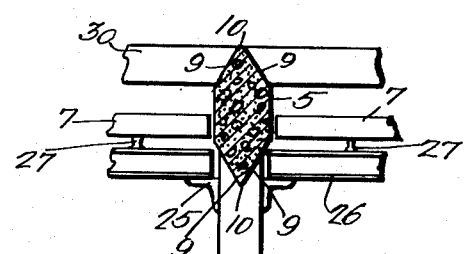
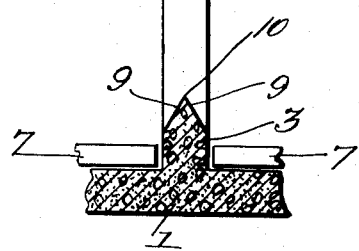
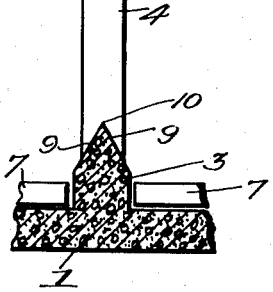
Inventor:-
William W. Sayers.
Marcus B. Tark.
by their Attorneys.
Howson & Howson Patented Apr. 7, 1931

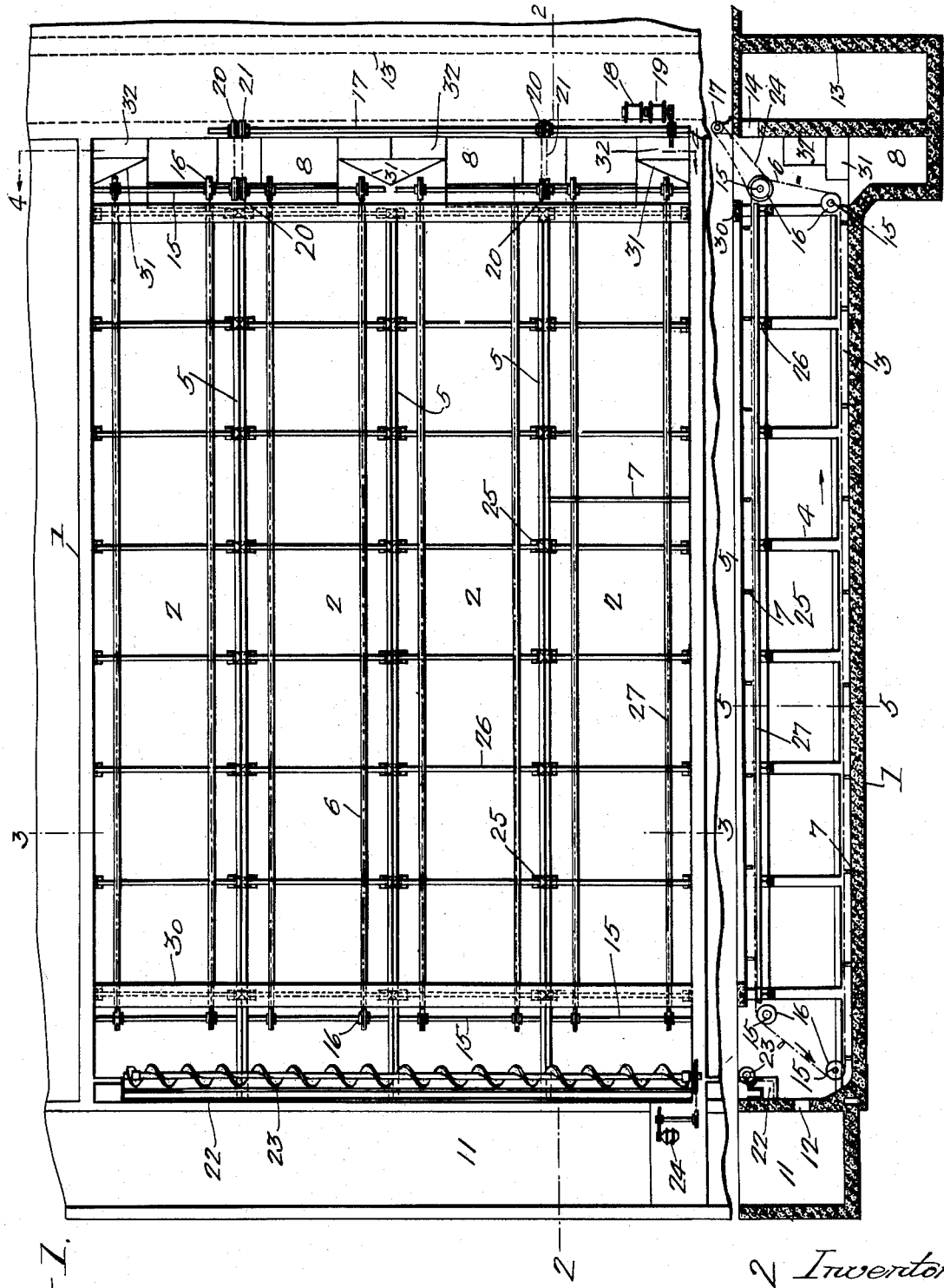

1,799,150

UNITED STATES PATENT OFFICE

WILLIAM W. SAYERS, OF CHICAGO, ILLINOIS, AND MARCUS B. TARK, OF PHILADELPHIA, PENNSYLVANIA, ASSIGNORS TO LINK-BELT COMPANY, OF CHICAGO, ILLINOIS, A CORPORATION OF ILLINOIS

SEWAGE-DISPOSAL APPARATUS

Application filed April 24, 1929. Serial No. 357,693.

Our invention relates to improvements in apparatus for treating sewage and particularly to mechanism by which the light as well as the heavy substances in sewage can be effectively removed.

An object of the invention is to provide means for treating sewage in large quantities and so constructed that the lighter ingredients especially can be controlled and subjected to the action necessary to dispose of them.

A further object of the invention is to provide a tank of considerable size and having mounted therein a plurality of devices for impelling to separate places of collection the light and heavy ingredients of the sewage that gather at the top and bottom of the tank as the sewage passes through it, the tank being designed so that the lighter floating ingredients are constrained to gather in areas that are necessarily and fully within the range of action of said devices, so that the removal of these ingredients can be complete.

Other objects and advantages of the invention are set forth in the following description taken with the drawings, on which we show some embodiments by which our invention can be practiced, but this disclosure is illustrative only, and we reserve the right to make changes that do not depart from the principle of the invention or exceed the scope and meaning of the broad terms in which the appended claims are expressed.

On the drawings:

Figure 1 is a top plan of an apparatus for treating sewage according to our invention;

Figure 2 is a longitudinal section on the line 2—2 through Figure 1;

Figure 3 is a cross section on the line 3—3 through Figure 1;

Figure 4 is a vertical section on the line 4—4 through Figure 1;

Figure 5 is a vertical section on the line 5—5 through Figure 2; and

Figure 6 is a similar view of a modification.

The same numerals identifying the same parts throughout.

We show at 1 a tank, the interior of which is divided into several chambers or sections 2, by ribs or struts 3 on the bottom of the tank; columns 4 rising from the struts 3 to support horizontal struts 5. The struts 3 and 5 extend lengthwise of the tank and the chambers communicate with each other between the columns, so that the whole interior of the tank is more or less unobstructed and open. The chambers 2 are traversed by endless conveyors having blades or flights 7. The lower run of each of these conveyors moves between adjacent ribs or struts 3 and the blades 7 sweep the heavier substances, which sink to the bottom of the tank, ahead of them into sumps 8 at one end of the tank. From these sumps, the heavier substances are removed by pumps and pipes, not shown, or in any suitable manner.

Our invention pertains more particularly to the parts of the apparatus for taking out the lighter ingredients, which are removed by the blades 7 along the top runs of the conveyors. These lighter substances float on the sewage water, and the inflow of the sewage in the tank 1 is therefore controlled so that the level is kept about at the height of the upper run of the conveyors and the top struts 5. Thus the blades at the top can have a skimming action along the surface of the sewage in the tank 1. We make the struts 3 with beveled sides 9, terminating in an upper edge 10 running along each strut, and we give the top of each upper strut 5 the same shape. It is also advisable to bevel the bottoms of the struts 5 to provide edges 10 along the lower sides of the struts 5. The beveled sides 9 of the ribs or struts 3 cause deposits thereon to run down into the spaces between these struts into the path of the blades moving along the bottom of the tank; and the beveled under sides of the upper struts have a similar effect; that is, the lighter substances, such as oils and grease, rising to the top, are guided by the beveled lower sides of the struts 5 to the surface of the sewage water between the struts 5, and thus come directly into the surface areas swept by the blades 7 of the conveyors; so that the lighter floating substances in the sewage can be effectively cleared out, as well as the heavier substances that sink to the bottom. The bevelling of the upper sides of the struts 5 prevents deposits thereon, and enables the struts 5 to be more readily washed down or sprayed with a hose. When the tank 1 is empty the beveled tops of the struts 3 have a similar utility.

The direction of movement of the conveyors 7 is shown by the arrows on Figure 2. At the end opposite the sumps 8, the tank 1 has a transverse influent trough 11, and this trough communicates with the tank through suitable inlet means 12. Adjacent the sumps 8 is a transverse effluent trough 13. This trough communicates through one side with the tank as shown at 14, and carries away the water from which all the sewage has been extracted.

The conveyors in each of the chambers 2 are mounted by means of shafts 15 in suitable bearings at the opposite ends of the tank, these shafts carrying gears 16 over which run suitable chains to which the ends of the blades or flights 7 are connected. Outside of the tank and preferably on the closed top of the trough 13 is a driving gear 17 which can be rotated by a motor 18 and reducing gear 19. This shaft has suitable gears 20 connected by chains 21 with similar gears on the adjacent shafts 15.

Along the inside of the tank at the influent end is a trough 22 for grease and other floating particles. Adjacent the mouth of this trough is mounted in suitable bearings a screw conveyor 23 which can be operated by a motor 24 mounted in any suitable position and connected to the conveyor 23 by gearing. The conveyors in operation sweep the heavier particles of sewage along the bottom of the tank 1 into the sumps 8 and the blades 7, moving in the opposite direction along the surface of the sewage in the tank 1, skim off the lighter particles which float; pushing these ahead toward the trough 22 into which they are impelled by the action of the conveyor 23.

The columns 4 are provided at their opposite sides with angle irons; some of which are also attached to the inner faces of the opposite sides of the tank 1. These angle irons support transverse beams 26 on which are longitudinal rails 27 to support the blades 7 and prevent the conveyors from sagging. The ends of the beams 26 are spaced slightly from the lower beveled sides of the struts 5; and, as shown in Fig. 5, the struts 5 may be slightly thicker than the columns 4. This feature prevents the ends of the blades from colliding with the columns as they are moved by the conveyors, should there by any tendency for the conveyors to shift sidewise. For the same purpose, the bottom struts 3 are made thicker than the columns 4.

Fig. 6 shows how the transverse beams can be omitted and the place of the rails 27 taken by longitudinal supports 28 which are slidably engaged by the opposite ends of the blades 7 as they are moved adjacent the struts 5. Along their inner top edges, these supports 28 may be beveled as shown at 29, enabling the lighter substances to pass up between the lower beveled sides of the struts 5 and the rails or guides 28. In this form also, the struts 5 and 3 can be made thicker than the columns 4, the same as in Fig. 5. Angle irons 25 hold the supports 28 in place.

If desired, the top struts 5 can be connected by transverse ribs or bars 30, as indicated in Figs. 3, 4, 5 and 6. These top bars or braces 30 are not shown in Figs. 1 and 2 except at the ends of the struts 3 and 5.

While four chambers 2 are shown, the sumps 8 are indicated as two in number only, one for each pair of chambers adjacent the trough 13. Between these two sumps are deflecting surfaces 31 adjacent the bottom of the tank arranged in diagonally opposite directions to cause the heavier substances of the two middle chambers to pass partly to one sump and partly to the other. Similar deflecting surfaces are arranged at the sides of the tank. The two sumps, as shown, are provided with sloping sides for convenience in emptying and cleaning. The parts providing the deflecting surfaces 31 may be made in the form of abutments of concrete at the sides of the sumps and between them and have sloping tops 32 to afford less lodgment to deposits and to enable them to be washed off to better advantage. With this apparatus, floating solids forming part of the sewage are effectively prevented from accumulating between the columns 4 in the top of the tank 1; because the beveled lower sides of the struts 5 deflect the lighter particles of sewage and cause them to flow directly into the path of the blades 7 of the top runs of the conveyors. Also, the beveled tops of the struts 5 prevent solids from resting or depositing thereon and shed them back into the sewage that is being treated.

Of course, various modifications of the construction herein described can be made without changing the real nature of the invention.

We claim:

1. Apparatus for the treatment of sewage comprising a tank, struts at the top of the tank, and conveyors having blades movable between said struts, the lower sides of said struts being beveled.

2. Apparatus for the treatment of sewage comprising a tank having struts therein, and conveyor blades movable between said struts, the lower sides of said struts being beveled in opposite directions and terminating in an edge running lengthwise of the struts.

3. Apparatus for treating sewage comprising a tank having struts therein, conveyors having blades movable between said struts, and columns for supporting the struts, the struts projecting beyond the sides of the columns adjacent the ends of said blades.

4. Apparatus for the treatment of sewage comprising a tank having a horizontal strut therein disposed adjacent the level to be assumed by the sewage in the tank, the strut being beveled on the underside thereof and terminating thereat in a longitudinal edge.

5. Apparatus for the treatment of sewage comprising a tank, and a horizontal strut in the tank extending lengthwise thereof adjacent the level to be assumed by the sewage in the tank, said strut being beveled in opposite directions on the lower side to present an edge extending along the lower side of the strut.

6. Apparatus for the treatment of sewage comprising a tank, and a horizontal strut in the tank disposed adjacent the level to be assumed by the sewage in the tank, said strut being beveled along the top and bottom to provide longitudinal edges.

7. Apparatus for the treatment of sewage comprising a tank, struts along the bottom of the tank and along the top adjacent the level to be assumed by the sewage, conveyor blades mounted to move adjacent the struts, and columns between the struts, the struts projecting beyond the opposite sides of the columns for the purpose set forth.

WILLIAM W. SAYERS.
MARCUS B. TARK.